(12) United States Patent
Krawczak

(10) Patent No.: US 7,715,081 B1
(45) Date of Patent: May 11, 2010

(54) RADIO FREQUENCY PHOTONIC LINK WITH DIFFERENTIAL DRIVE TO AN OPTICAL RESONATOR ELECTRO-OPTIC MODULATOR

(75) Inventor: John A. Krawczak, Minnetonka, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 75 days.

(21) Appl. No.: 11/903,718

(22) Filed: Sep. 24, 2007

(51) Int. Cl.
*G02F 1/03* (2006.01)
*G02F 1/035* (2006.01)
(52) U.S. Cl. .......................... 359/245; 385/2
(58) Field of Classification Search ................ 359/237, 359/245, 248, 254, 260; 385/1–3, 15–18, 385/131
See application file for complete search history.

(56) References Cited

U.S. PATENT DOCUMENTS 6,389,197 B1 5/2002 Iltchenko et al.
6,473,218 B1 10/2002 Maleki et al.

OTHER PUBLICATIONS

Cohen, David A. "Lithium Niobate Microphotonic Modulators". Dissertation, University of Southern California, May 2001, pp. ii-160.
Hossein-Zadeh, Mani, et al. "14.6-GHz LiNbO3 Microdisc Photonic Self-Homodyne RF Receiver". IEEE Trans. on Microwave Theory . . . , vol. 54, No. 2, Feb. 2006, pp. 821-831.

*Primary Examiner*—William C Choi
(74) *Attorney, Agent, or Firm*—Brooks, Cameron & Huebsch, PLLC

(57) ABSTRACT

A number of electro-optic modulation systems, apparatuses, and methods are disclosed. For example, one radio frequency photonic link with differential drive to an optical resonator electro-optic modulator includes an optically resonant body having a surface for receiving an optical carrier beam, a first electrode for receiving a first electrical signal to the resonator body, and a second electrode for receiving a second electrical signal to the resonator body that is different than the first electrical signal.

19 Claims, 3 Drawing Sheets

RADIO FREQUENCY PHOTONIC LINK WITH DIFFERENTIAL DRIVE TO AN OPTICAL RESONATOR ELECTRO-OPTIC MODULATOR

FIELD OF THE DISCLOSURE

The present disclosure relates to optical communication. In particular, the present disclosure relates to radio frequency photonic links with differential drive for optical resonator electro-optic modulator devices and systems utilizing such devices.

BACKGROUND

In the field of optical communication, information can be encoded onto a light beam through use of an optical modulator in order to create an optical signal that is encoded with information that can be transferred from one device to another via an interconnection medium. As the opportunities to apply photonic solutions to more and more communications applications multiply the solutions that may be applicable for some environments, may not be applicable to all environments.

For example, in some air, space, water craft, and ground vehicle environments, among others, the size, weight, power consumption, and/or quality of the signal can be issues of importance that may not be important in other applications. For example, in many applications, a communications system for a military avionics application may have significantly different issues regarding these factors than a communications system between two buildings.

Optical communication systems use one or more optical carrier waves to provide signal transmission between two or more points. These transmissions are typically high-speed and/or wide bandwidth signal transmissions that allow the passage of more information than electrical communication systems.

An optical carrier wave can be transmitted either through the free space or in an optical waveguide channel such as an optical fiber and can, therefore be utilized in applications that electrical communication may not be able to be applied. In some embodiments, instead of an optical only system, the system can include the use of one or more other non-optical communication systems, such as wired networks, radio wireless networks, satellite communication systems, can be combined with optical systems to meet various communication needs and requirements. Such systems can include other communications types such as electrical, radio frequency (RF) and others.

An optical communication system may include a light source, such as a laser, to produce the optical carrier wave. In order to provide a communication signal onto the optical carrier wave an optical modulator can be utilized to modulate the optical carrier wave to carry the information. The optical modulator may modulate the phase or amplitude of the optical carrier wave, among other properties.

In such systems, an optical receiver, which may include a photodetector to convert the optical information into a desired electronic format for further processing, can be used to receive the information.

SUMMARY

A number of radio frequency photonic links with differential drive for optical resonator electro-optic modulator systems, apparatuses, and methods are disclosed. Such embodiments can be utilized, for example, in aircraft, watercraft, spacecraft, and ground motorized vehicles (i.e., landcraft).

Generally, an optical resonator uses an optical feedback mechanism to store optical energy. An optical carrier beam is input into an optical cavity (sometimes in a ring, sphere, truncated sphere, or disk shape). The optical resonator can re-circulate the optical carrier beam inside the optical cavity, thereby delaying the light beam for a period of time and allowing it to interfere constructively or destructively with further incoming light, for example, from the same source, among other benefits.

Within the optical cavity in resonance, the optical carrier beam is a stream of light waves having positions of constant phase. If a phase delay in the optical cavity can be modulated, a modulation on the output from an optical resonator can be achieved. The modulation on the phase delay of re-circulating wave in the cavity can, for example, be equivalent to a shift between a resonance condition and a non-resonance condition and can be between any two different values in the phase delay.

The present disclosure utilizes such a modulation technique to enhance light modulation. The phase delay of the optical feedback (i.e. positions of optical cavity resonances) can be changed by changing the refractive index of the resonator by electro-optic modulation.

An external electrical signal can be used to modulate the optical phase in the resonator to shift the phase of the optical beam which will also change the resultant output signal. In some embodiments, such an optical modulator can operate at a low operating voltage, such as in the millivolt range.

Such embodiments can achieve a high modulation speed, for example, in the order of tens of gigahertz or higher. Such embodiments can also, for example, have a compact package which may aid in positioning of the apparatus and may aid with regard to weight, in some applications.

The optical coupling with the resonator may be implemented through free space, with waveguides, and/or with fibers for integration with other fiber optical elements or integrated electro-optical circuits. Accordingly, such optical modulators may be used in a variety of applications having optical modulation, including optical communication and optical signal processing, among others.

Such modulators (i.e., an optical resonator with an electrical input for modulation of an input optical beam) can, for example, be formed from a dielectric material. One such suitable dielectric material is lithium niobate ($LiNbO_3$), but other suitable materials, such as other electro-optic materials, for example, can be utilized in various embodiments.

One shape that can be used for the resonator body can be a sphere shape. However, as discussed above, geometries based on a spheres and other curved shapes or shapes having curved shaped surfaces are also possible, including a disk cavity (i.e., a truncated sphere where both the top and bottom have been truncated forming a disk shape) or a ring cavity (i.e., a hollowed out disk shape).

In such resonators, optical energy can be coupled into the resonator by evanescent coupling (e.g., through use of an optical coupler near the resonator body by less than one wavelength of the optical radiation). In some embodiments, such resonators have a special set of resonator modes known as "whispering gallery modes".

These modes represent fields confined in an interior region close to the surface of the resonator (e.g., around its equator) due to the internal reflection of the radiation. Since resonators having a 10 micron or larger diameter have a resonator dimension much larger than the wavelength of light, the loss due to the finite curvature of the resonator may be negligible.

Resonators may also be designed to have a high quality factor (Q). In such embodiment, the resonators may only be limited, for example, by attenuation of radiation in the dielectric material and the surface imhomogeneities. Such high Q values may allow concentration of strong fields in the carrier transmission modes (e.g., whispering gallery modes).

High-Q resonators have been used in a number of devices, including narrow band filters, lasers, laser stabilizers, and low noise RF oscillators, and other applications.

As is understood by those of skill in the art, a proper electrical signal can form an electrical resonator to support electrical energy for modulation of the optical carrier beam with proper phase matching conditions. Hence, electrical and optical waves can co-exist and can be prepared to enhance their interactions under certain conditions.

When the optical resonator body is formed of an electro-optic material, the electrical signal can be used to alter or modulate the dielectric constant of the resonator body and therefore modulate the optical carrier beam based on electro-optic effects. These effects can be increased by utilizing multiple electrical signals and/or by using electrical resonance conditions as will be described in more detail herein.

As stated above, the present disclosure includes a number of optical resonator embodiments. For example, in some embodiments, an optical resonator can include an optically resonant body having a surface for receiving an optical carrier beam. As discussed above, in some embodiments, at least a portion of the resonator body can be constructed from lithium niobate.

The optical resonator can include a first electrode for providing a first electrical signal to the resonator body, in various embodiments.

In order to increase the amount of amplitude in the output signal a number of electrodes with their signals having the same or different polarities can be utilized.

In various embodiments, a second electrode for providing a second electrical signal to the resonator body that is different than the first electrical signal can be provided in the optical resonator. For example, in some embodiments, the first electrical signal has a first polarity and the second electrical signal has a second polarity that is different from the first polarity, such as a first electrical signal having a first polarity and a second electrical signal having a second polarity that is opposite from the first polarity. In such embodiments, when applied to the corresponding phase of the optical carrier beam, the amplitude of the optical carrier beam can be increased.

As discussed above, the optically resonant body may be formed in a number of suitable shapes. For example, in some embodiments, the shape of the optically resonant body can be spherical.

In various embodiments, the optically resonant body is generally cylindrical, or disk shaped. The optically resonant body can also be a truncated sphere (e.g., having a truncated top and bottom). In various embodiments, the optically resonant body can be a ring shaped body. The optically resonant body can be a whispering gallery mode resonator, in some embodiments.

The present disclosure also includes a number of electro-optical modulator embodiments. For example, in some embodiments, the electro-optical modulator (e.g., a micro-disk electro-optic modulator) can include an optically resonant body having a surface for receiving an input optical signal and a surface for emitting an optical output signal.

Modulators can also include a first electrode mounted on the body for receiving a first electrical signal to the resonator body. A second electrode mounted on the body for receiving a second electrical signal to the resonator body, can also be included in some embodiments. In narrow band modulation applications these electrodes may be resonant to the electrical signal.

In various embodiments, the first electrode and the second electrode are mounted adjacent to each other. However, in some embodiments, the first electrode and the second electrode are mounted in a non-adjacent configuration.

The first and second electrodes can be located in various suitable locations. For example, in some embodiments, the resonator body can have at least one side surface and top surface among others, and the surface for receiving an input optical signal can be the side surface of the resonator body (e.g., a truncated sphere having a truncated top and bottom and a curved side surface) and at least one of the first and second electrodes are mounted to a top or bottom surface of the resonator body.

In various embodiments, a differential drive electrical amplifier can be utilized to provide the first and second electrical signals to the first and second electrodes. Such a structure allows the differential drive electrical amplifier to provide a mirror of the first electrical signal. When properly aligned with the optical carrier beam, the first and second electrical signals (e.g., opposites) can improve the performance factor Q (e.g., by a factor of four, in some embodiments).

The present disclosure also includes a number of method embodiments. For example in some method embodiments the method can include coupling an optical carrier beam into an optical resonator.

The method can also include coupling a first electrical signal into the optical resonator to modulate the optical carrier beam. In some embodiments the method can include coupling a second electrical signal into the optical resonator to modulate the optical carrier beam.

The present disclosure also includes a number of system embodiments. For instance in some system embodiments the system can include an antenna for receiving a radio frequency electrical signal that can, for example, be directly applied to an electrode or indirectly via a radio frequency amplifier with differential outputs.

Systems can also include a differential drive electrical amplifier to convert the electrical signal into a first polarity electrical signal and a second polarity electrical signal.

In various embodiments, a system can include an optical source for providing an optical carrier beam.

In some embodiments, an optically resonant resonator body having a surface for receiving the optical carrier signal can be part of the system. System embodiments can also include a first electrode mounted on the body for receiving the first polarity electrical signal to the resonator body. A second electrode mounted on the body for receiving the second polarity electrical signal to the resonator body can also be provided in various embodiments.

In various embodiments the system has a whispering gallery mode with N number of maxima, N number of minima and where the system includes 2N number of electrodes. In such embodiments each electrode is positioned over a location on the optically resonant body where one of the maxima or minima is predicted to occur. In various embodiments, each electrode can be positioned over a location on the optically resonant body where a minima is predicted to occur.

System embodiments can also include a prism coupler for directing the optical carrier beam into the resonator body. The prism coupler can be shaped to also direct an outgoing optical signal to a receiver, in some embodiments. In some embodiments, multiple prisms can be utilized, in addition to or in place of the prism coupler, for separate input and output interfaces.

DETAILED DESCRIPTION

Figure 1:
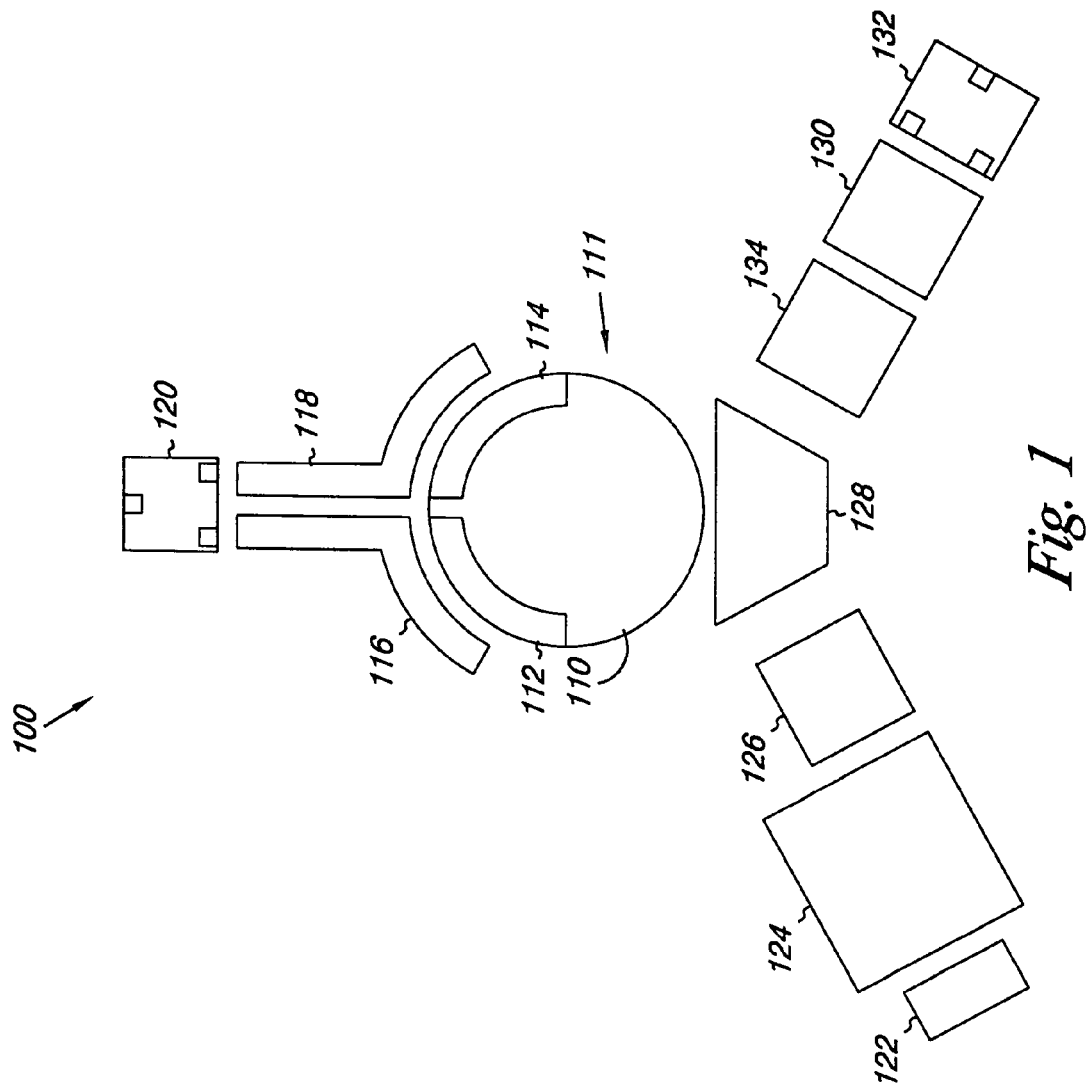
FIG. 1 is an illustration of a radio frequency photonic link that utilizes an electro-optical modulator according to an embodiment of the present disclosure

The present disclosure includes a number of method, apparatus, and system embodiments. Embodiments of the present disclosure will now be described in relation to the accompanying drawings, which will at least assist in illustrating various features of the various embodiments.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2.

As will be appreciated, elements shown in the various embodiments herein can be added, exchanged, and/or eliminated so as to provide a number of additional embodiments. In addition, discussion of features and/or attributes for an element with respect to one figure can also apply to the element shown in one or more additional figures.

FIG. 1 is an illustration of a radio frequency photonic link that utilizes an electro-optical modulator according to an embodiment of the present disclosure. The radio frequency photonic link 100 of FIG. 1 includes a number of components.

For example, FIG. 1 includes an optical resonator 111 having a resonator body 110 and a number of electrodes (e.g., electrodes 112 and 114). In order to provide a signal that is to be modulated onto an optical carrier beam, the radio frequency photonic link embodiment of FIG. 1 also includes a monolithic microwave integrated circuit (MMIC) and a number of electrodes (e.g., electrodes 116 and 118) for receiving radio frequency signals, converting them to electrical signals, and transferring the electrical signals to the electrodes 112 and 114 on the resonator body 110.

As discussed above, the radio frequency photonic link 100 can include a MMIC 120 or other mechanism that can convert a single input signal into a copy of itself and/or with amplification and an identical copy of itself but with the opposite polarity. The small internal square on one side is an input and the two small internal squares on the other side are the two output copies. The device need not be specifically a MMIC. If the disk were large a low frequency device could be used. Nor is amplification essential. The functionality of this component is to provide opposite polarities from the two output connections.

Such embodiments can be useful in a number of applications, such as for example, very compact millimeter wave radio frequency photonic links and many other applications.

The radio frequency photonic link can also include a number of prisms (e.g., prism 128). The one or more prisms can be provided in various suitable shapes. The shape illustrated in the embodiment of FIG. 1 allows for an input carrier beam from a light source 122 (e.g., a laser or other light source type) to be provided to the resonator 111 and for an output carrier beam to be conveyed to a photodetector, for example, but other prism arrangements, including multiple prisms are possible.

The shape of prism 128 also allows for a modulated carrier signal to be output from the resonator 111 and directed to a receiver 130 (e.g., photodiode). As shown in the embodiment of FIG. 1, the radio frequency photonic link 100 can also include an amplifier 132 to amplify an electrical output signal created by the receiver 130 to represent the optical output signal that was received by the receiver 130, in some embodiments.

In various embodiments, such as the embodiment illustrated in FIG. 1, the radio frequency photonic link can also include an optical isolator 124. It prevents light that may get out of the resonator body 110 or reflects off of the prism 128 that is inadvertently directed back at the light source from disturbing the light source.

Further, in some embodiments, such as the embodiment illustrated in FIG. 1, the radio frequency photonic link can also include one or more lenses. For example, the embodiment of FIG. 1 includes a coupling lens component 126 that can include one or more lenses. The lens component 126 can be provided, for example, to get the light from the light source configured for increased (e.g., maximum) coupling into the prism 128 and/or resonator body 110. It should be noted that the position of the isolator 124 and lens component 126 can be swapped in some embodiments.

Figure 2:
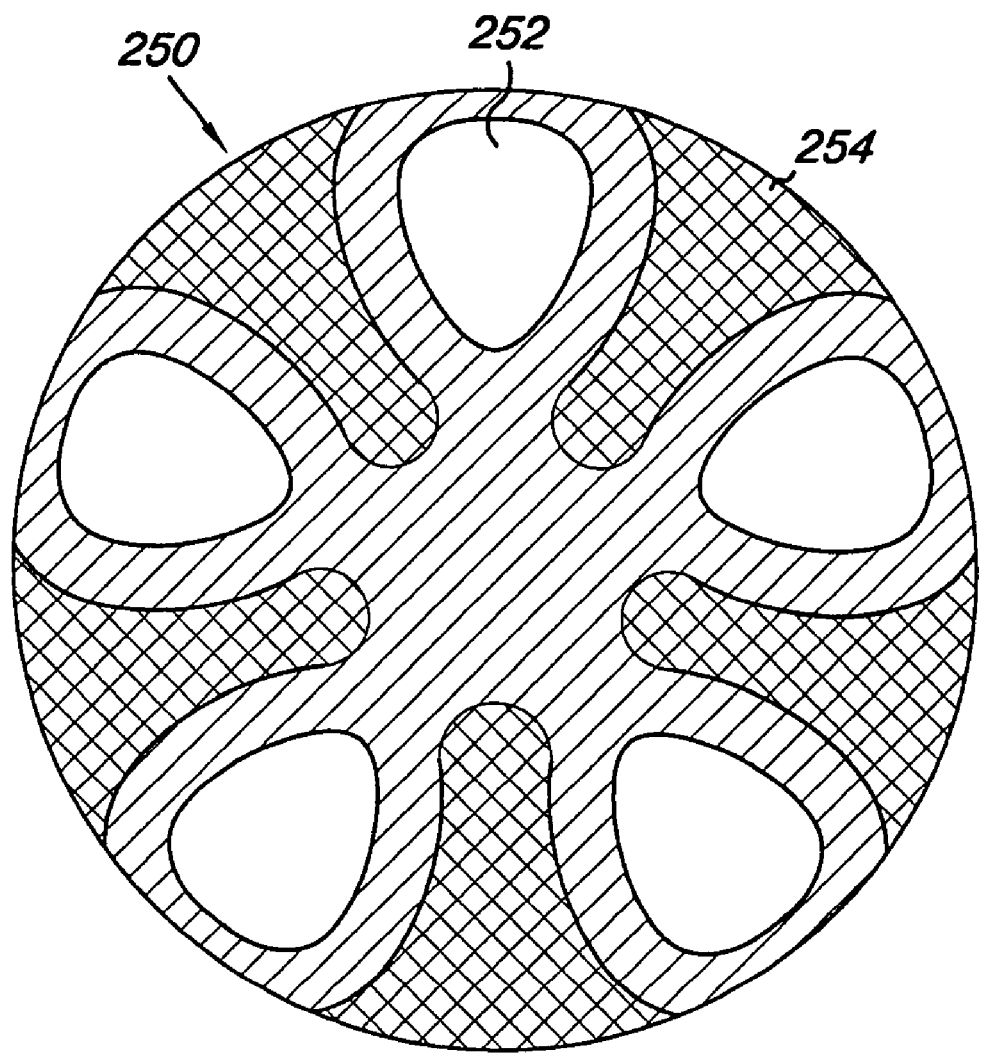
FIG. 2 is an illustration of maxima and minima that may be created within some embodiments of a disk type resonator body.

FIG. 2 is an illustration of the whispering gallery mode optical maxima and minima that may be created within some embodiments of a disk type resonator body. In the illustration of FIG. 2, the optical resonator body 250 is depicted having a number of maxima 252 and a number of minima 254 based upon the wave structure of the optical carrier beam, the diameter of the resonator, and one or more propagation characteristics of the material used to construct the resonator body 250. In some embodiments, by positioning an electrode over one or more maxima and/or minima, the characteristics of the optical carrier phase delay can be changed.

Figure 3:
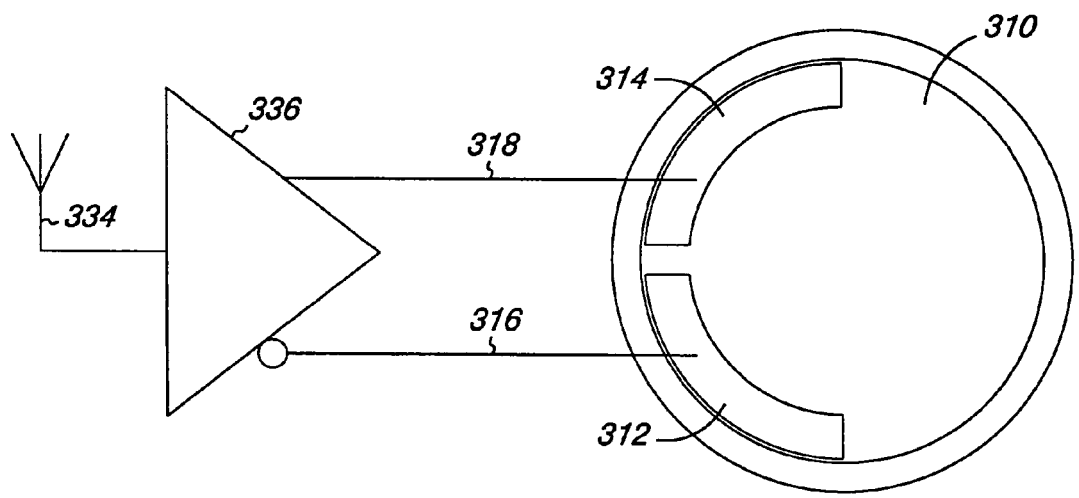
FIG. 3 is an illustration of a micro disk resonator with an antenna and a differential drive electrical amplifier according to an embodiment of the present disclosure.

FIG. 3 is an illustration of a micro disk resonator with an antenna and a differential output drive electrical amplifier according to an embodiment of the present disclosure. In the embodiment of FIG. 3, the embodiment includes an antenna 334, a differential output drive electrical amplifier 336, a connection 318 that provides an electrical signal having a first polarity, a connection 316 that provides an electrical signal having a second polarity, and a resonator body 310 that has a number of electrodes oriented adjacent to each other (e.g., electrodes 312 and 314).

In the context of this disclosure, the term adjacent means to be proximate to one another and positioned according to an adjacent whispering gallery mode maxima/minima pair. However, as stated above, in some embodiments the electrodes are non-adjacent, such as where one of the electrodes is positioned according to a whispering gallery mode maximum and the other according to a whispering gallery mode minimum.

Figure 4:
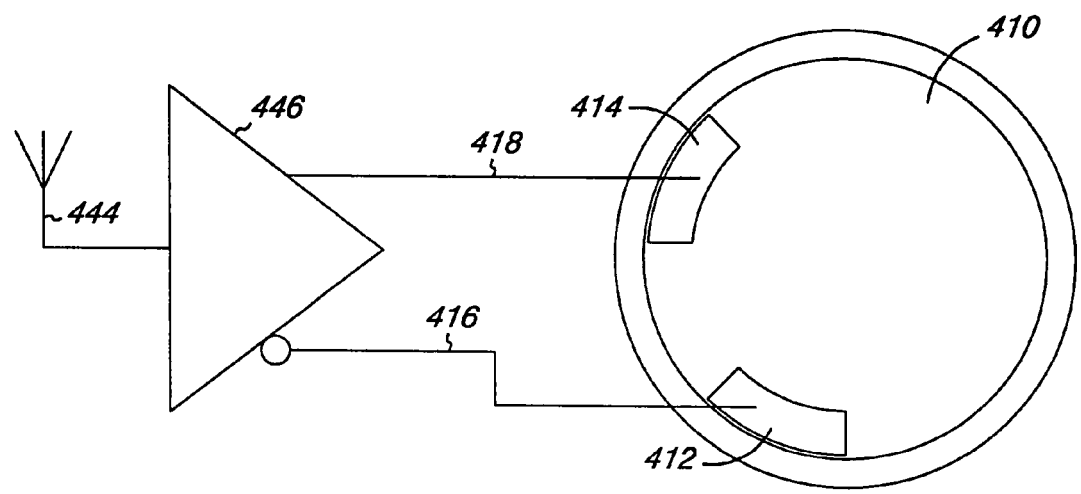
FIG. 4 is an illustration of another micro disk resonator with an antenna and a differential drive electrical amplifier according to an embodiment of the present disclosure.

FIG. 4 is an illustration of another micro disk resonator with an antenna and a differential drive electrical amplifier according to an embodiment of the present disclosure. In the embodiment of FIG. 4, the embodiment similarly includes an antenna 444, a differential output drive electrical amplifier 446, a connection 418 that provides an electrical signal having a first polarity, a connection 416 that provides an electrical signal having a second polarity, and a resonator body 410 that has a number of electrodes. However, in the embodiment of FIG. 4, the electrodes are oriented in a non-adjacent manner (e.g., electrodes 412 and 414).

Further, although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the present disclosure.

It is to be understood that the above description has been made in an illustrative fashion, and not a restrictive one. Combination of the above embodiments, and other embodiments not specifically described herein will be apparent to those of ordinary skill in the art upon reviewing the above description.

The scope of the various embodiments of the present disclosure includes various other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure require more features than are expressly recited in each claim.

Rather, as the following claims reflect, inventive subject matter may lie in less than all features of a single disclosed embodiment. Thus, the following claims are hereby incorporated into the Detailed Description, with each claim standing on its own as a separate embodiment.

The invention claimed is:

1. An electro-optic modulator, comprising:
    an optically resonant body having a surface for receiving an optical carrier beam;
    a first electrode for receiving a first electrical signal to the resonator body;
    a second electrode for receiving a second electrical signal to the resonator body that is different than the first electrical signal; and
    a differential drive electrical amplifier to provide the first and second electrical signals to the first and second electrodes.

2. The electro-optic modulator of claim 1, where at least a portion of the optically resonant body is constructed from lithium niobate.

3. The electro-optic modulator of claim 1, where the first electrical signal has a first polarity and the second electrical signal has a second polarity that is different from the first polarity.

4. The electro-optic modulator of claim 1, where the first electrical signal has a first polarity and the second electrical signal has a second polarity that is opposite from the first polarity.

5. The electro-optic modulator of claim 1, where the optically resonant body is spherical.

6. The electro-optic modulator of claim 1, where the optically resonant body is generally cylindrical.

7. An electro-optical modulator, comprising:
    an optically resonant body having a surface for receiving an input optical signal;
    a first electrode mounted on the body for receiving a first electrical signal to the resonator body;
    a second electrode mounted on the body for receiving a second electrical signal to the resonator body that is different than the first electrical signal; and
    a differential drive electrical amplifier to provide the first and second electrical signals to the first and second electrodes.

8. The electro-optical modulator of claim 7, where the optically resonant body is a truncated sphere having a truncated top and bottom.

9. The electro-optical modulator of claim 7, where the first electrode and the second electrode are mounted adjacent to each other.

10. The electro-optical modulator of claim 7, where the surface for receiving the input optical signal is a side surface of a truncated sphere having a truncated top and bottom and at least one of the first and second electrodes are mounted to a top surface of the truncated sphere.

11. The electro-optical modulator of claim 7, where the modulator is a micro-disk electro-optic modulator.

12. The electro-optical modulator of claim 7, where the optically resonant body is a ring shaped body.

13. The electro-optical modulator of claim 7, where the optically resonant body is a whispering gallery resonator.

14. A method, comprising;
    coupling an optical carrier beam into an optical resonator;
    providing, by a differential drive electrical amplifier, a first electrical signal into the optical resonator to modulate the optical carrier beam; and
    providing, by the differential drive electrical amplifier, a second electrical signal into the optical resonator that is different than the first electrical signal to modulate the optical carrier beam.

15. An electro-optical modulation system, comprising:
    an antenna for receiving a radio frequency signal and converting the signal into an electrical signal;
    a differential drive electrical amplifier to convert the electrical signal into a first polarity electrical signal and a second polarity electrical signal that is different than the first polarity electrical signal;
    an optical source for providing an optical carrier beam;
    an optically resonant resonator body having a surface for receiving the optical carrier signal;
    a first electrode mounted on the body for receiving the first polarity electrical signal to the resonator body; and
    a second electrode mounted on the body for receiving the second polarity electrical signal to the resonator body.

16. The electro-optical modulation system of claim 15, where the system has N number of maxima, N number of minima, and where the system includes 2N number of electrodes.

17. The electro-optical modulation system of claim 16, where each electrode is positioned over a location on the optically resonant body where at least one of the maxima or minima is predicted to occur.

18. The electro-optical modulation system of claim 15, where the system includes a prism coupler for directing the optical carrier beam into the resonator body.

19. The electro-optical modulation system of claim 15, where the prism is shaped to direct an outgoing optical signal to a receiver.

* * * * *